Nov. 15, 1927.
J. W. LEDOUX ET AL
FLUID METER
Filed Nov. 10, 1921
1,649,602
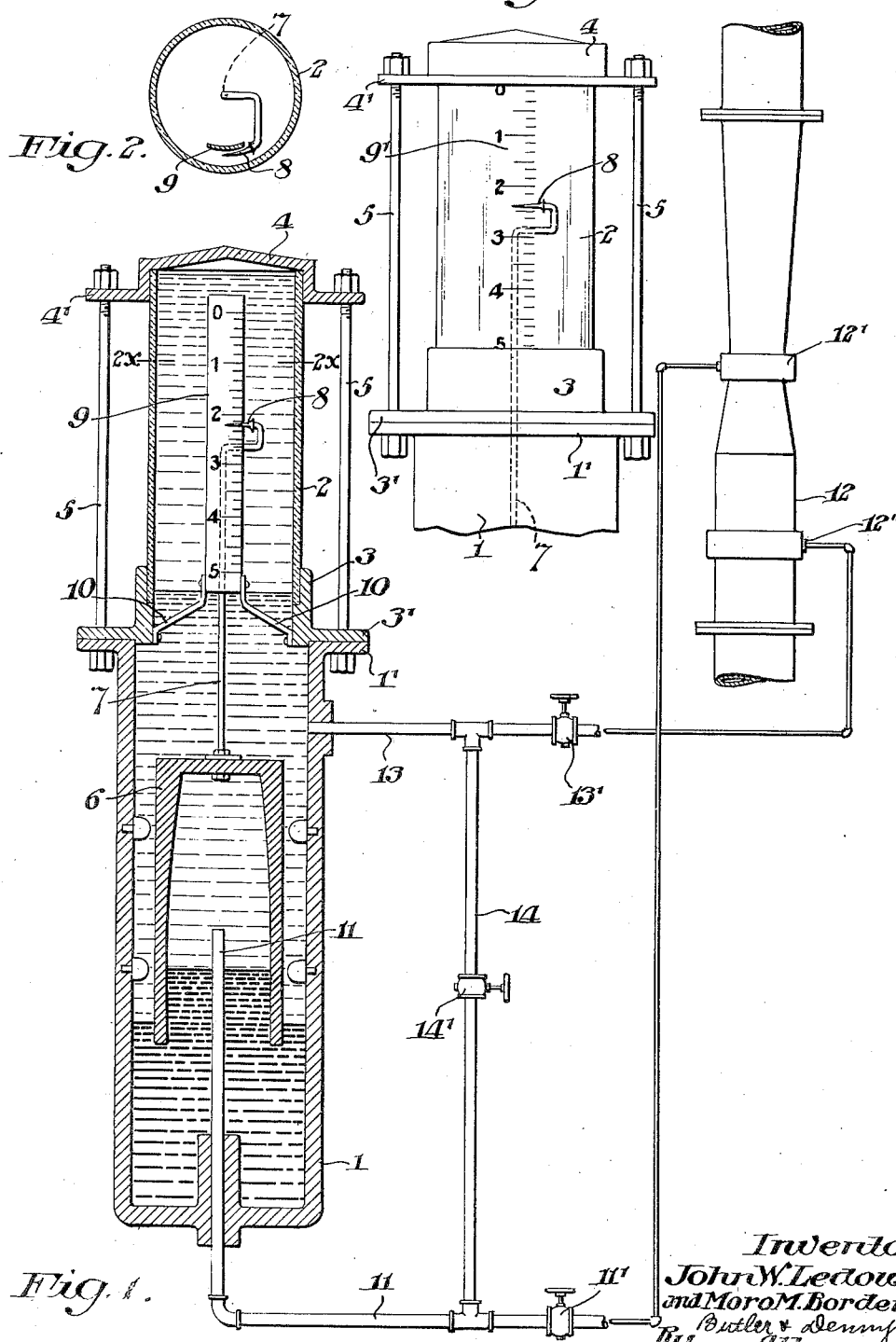

Patented Nov. 15, 1927.

1,649,602

UNITED STATES PATENT OFFICE.

JOHN W. LEDOUX, OF SWARTHMORE, PENNSYLVANIA, AND MORO M. BORDEN, OF COLLINGSWOOD, NEW JERSEY, ASSIGNORS TO SIMPLEX VALVE & METER COMPANY, OF PHILADELPHIA, PENNSYLVANIA, A CORPORATION OF NEW JERSEY.

FLUID METER.

Application filed November 10, 1921. Serial No. 514,152.

This invention relates more particularly to indicating means adapted for use with differential pressure apparatus to show the flow of liquids.

The invention is characterized by the use of an indicator movable within the pressure chamber of the meter over a scale contained in a transparent section of the chamber or over a scale formed in a transparent section of such chamber; the chamber or chamber's section in which the indicator moves containing preferably a column of clear oil to provide a medium that will not be affected by the color of the liquid to be measured.

The invention is embodied in the apparatus set out in the following description and the accompanying drawings in illustration thereof.

In the drawings, Fig. 1 is a vertical sectional view of apparatus embodying our improvements as applied to a conduit containing a Venturi section; Fig. 2 is a sectional view taken on the line $2^x$—$2^x$ of Fig. 1; and Fig. 3 is an elevation of the top of the pressure chamber having a transparent section provided with a scale cooperating with the pointer to indicate the rate of flow.

The mechanism illustrated comprises a pressure chamber provided by the lower metal casing section 1 and the upper concentric transparent section 2 fixed thereto through the coupling 3 by the cap 4 and the bolts or rods 5, the latter passing through the flange 1' on the top of the section 1, the flange 3' on the bottom of the coupling 3 and the flange 4' on the bottom of the cap 4.

A hollow inverted float 6 is movable vertically in the casing section 1 and sealed by a fluid therein, such as mercury, heavier than that to be measured. This float has fixed to its top a rod 7 provided with a pointer 8 which is movable vertically over the vertical scale 9, the latter being supported in the casing section 2 by the brackets 10 fixed to the coupling 3. The casing contains preferably a body of transparent oil adapted for filling the section 2 in the operation of the mechanism, the oil floating on the water admitted to the casing.

A pipe 11 passes through the bottom of the casing section 1, and through the heavy liquid therein, into the float 6, this pipe being connected with a conduit 12 at the Venturi section 12' thereof.

A pipe 13 connects the interior of the section 1, above the mercury therein, with the main section 12" of the conduit.

The pipes 11 and 13 contain the respective valves 11' and 13' and are connected by a pipe 14 containing a valve 14', for regulating the flow through such pipes.

As illustrated in Fig. 3, the glass section 2 may be provided with the transparent scale 9' formed therein or thereon in any suitable manner, as by etching; the pointer being viewed through this scale to determine the position of the float and the corresponding rate of flow in the conduit.

As the pressure communicated to the interior of the float by the pipe 11 from the Venturi section 12', is less than the pressure communicated to the exterior of the float from the normal section 12" through the pipe 13, the float will move downwardly in the mercury as the flow in the conduit increases. Consequently, the pointer 8 will move from the zero point on the scale 9 or 9', when there is no flow in the conduit, downwardly along the scale as the rate of flow in the conduit increases, the float being so shaped that its movement and the movement of the indicator shall be a function of the rate of flow to be indicated, such that the scale may be of simple and uniform graduation.

Having described our invention, we claim:—

1. In a liquid meter, a pressure chamber provided with a transparent section containing a clear liquid lighter than that to be measured and with a graduated scale, an indicator movable in the liquid in said section relatively to said scale, and means operated by fluid pressure for moving said indicator relatively to said scale and means for varying the pressure in functional relation to changes in the rate of flow of a fluid.

2. In a liquid meter, a casing provided with a transparent section and a scale, a transparent liquid in said section, a pointer movable in said liquid relatively to said scale, differential pressure mechanism for moving said pointer, and means for varying the pressure in functional relation to the flow of a liquid to be indicated.

3. In a liquid meter, a differential pressure chamber having a transparent section, differential pressure mechanism operable by variations in pressure applied thereto, means for varying the pressure in functional relation to variations in the rate of flow of the liquid to be measured, and means visible through said transparent section for indicating said rate.

4. In a liquid meter, a casing having a glass top section, said casing provided with a liquid heavier than that to be indicated, a hollow float in said casing and sealed by said liquid, means for communicating differential pressures from a flowing liquid to be measured to the interior of said casing and one within and the other without said float, and means wholly within said casing and movable in said top section for indicating the movements of said float and variations in the rate of flow.

5. A liquid meter comprising a casing having a transparent section, a hollow float in said casing and so shaped that its movement is a function of the rate of flow to be indicated, an indicator movable directly by said float, a liquid heavier than the flowing fluid to be measured in said casing and sealing said float, a liquid lighter than the flowing fluid to be measured in said casing and surrounding said indicator, means connecting the flowing fluid to be measured with said casing between the heavier and lighter liquid aforesaid, and means connecting the flowing fluid to be measured with the interior of said hollow float.

Signed at Philadelphia, county of Philadelphia and State of Pennsylvania, this 5th day of November, 1921.

JOHN W. LEDOUX.
MORO M. BORDEN.